(12) United States Patent
Soryal et al.

(10) Patent No.: US 12,556,884 B2
(45) Date of Patent: Feb. 17, 2026

(54) DETERMINING AND USING ELEVATION OF A USER DEVICE

(71) Applicant: AT&T Intellectual Property I, L.P., Atlanta, GA (US)

(72) Inventors: Joseph Soryal, Glendale, NY (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 357 days.

(21) Appl. No.: 17/986,960

(22) Filed: Nov. 15, 2022

(65) Prior Publication Data

US 2024/0163640 A1    May 16, 2024

(51) Int. Cl.
*H04W 4/90*  (2018.01)
*H04W 4/029*  (2018.01)
*H04W 4/33*  (2018.01)

(52) U.S. Cl.
CPC .......... *H04W 4/029* (2018.02); *H04W 4/33* (2018.02); *H04W 4/90* (2018.02)

(58) Field of Classification Search
CPC .......... H04W 4/90; H04W 4/33; H04W 4/029
See application file for complete search history.

(56) References Cited

U.S. PATENT DOCUMENTS

| | | | |
|---|---|---|---|
| 2015/0156611 A1* | 6/2015 | Aggarwal | H04W 24/08 455/456.1 |
| 2017/0013549 A1* | 1/2017 | Ou | H04W 48/16 |
| 2018/0158104 A1* | 6/2018 | Malloy | H04L 67/52 |
| 2018/0372836 A1* | 12/2018 | Lu | H04W 4/024 |
| 2021/0333863 A1* | 10/2021 | Chen | G06V 40/172 |

\* cited by examiner

*Primary Examiner* — Dai Phuong
(74) *Attorney, Agent, or Firm* — Hartman & Citrin LLC

(57) ABSTRACT

Determining and using elevation of a user device can include generating router location data that comprises an identifier that identifies a router that is located at a geographic location and data that specifies an elevation at which the router is located at the geographic location and detecting an elevation data request. The elevation data request can identify the router and can be associated with a user device. The router location data can be queried to determine the elevation at which the router is located. Based on the elevation at which the router is located, elevation data can be generated. The elevation data can indicate the elevation at which the router is located and the elevation data can be sent to the user device.

20 Claims, 9 Drawing Sheets

DETERMINING AND USING ELEVATION OF A USER DEVICE

BACKGROUND

In years past, landline telephones were present in a majority of households and businesses. In the event of an emergency call, emergency call operators such as 911 operators were able to determine the address and geographic location of the calling party with a high degree of accuracy and reliability. In more recent years, many phone customers have added mobile telephone plans and/or moved their landline service to a mobile device. Mobile devices by nature are not generally tied to a particular location and/or address.

In some instances, a user may elect to use WiFi calling on a mobile telephone. In the event of such an election, carriers may require a user to provide an address associated with the device. Thus, if an emergency call is made by a user using the mobile device, the address provided to the carrier can be forwarded to the 911 operator or other personnel to respond to the call. Alternatively, many devices are equipped with location devices and the devices can provide their location to a carrier, or the carrier can determine the location of the device, in the event of an emergency call.

In multi-story and/or multi-tenant buildings, however, a street address alone may be insufficient to locate a calling party. In particular, a carrier may be unaware as to what floor the device is located on, thereby delaying a response to an emergency call. Some governmental entities may mandate the determination and/or collection of elevation and/or altitude information in addition to approximate geographic location. Determining elevation and/or altitude may be difficult inside buildings and/or in locations at which traditional location determination techniques are unreliable and/or unavailable such as at locations without cellular connectivity.

SUMMARY

The present disclosure is directed to determining and using elevation of a user device. A device such as a user device can be located at a geographic location. The user device can be configured to execute an elevation application that can be configured to detect a use for an elevation determination (e.g., to determine a current elevation or altitude of the user device) for some purpose such as, for example, navigation purposes, emergency calls (e.g., an E911 call), for data collection purposes, combinations thereof, or the like. The user device can generate an elevation data request that requests an elevation determination from an elevation service. In some other embodiments of the concepts and technologies disclosed herein, the elevation application can be configured to collect router information before generating the elevation data request.

In particular, the elevation application can be configured to detect one or more routers (e.g., Wi-Fi hotspots, Wi-Fi routers, or the like) in proximity to the user device and to measure signal strengths between the user device and the one or more routers, with the elevation application including, in the elevation data request, data that identifies the one or more routers and one or more measured signal strengths between the user device and the one or more routers. The user device can send the elevation data request (with or without the router data and/or signal strengths) to the elevation service or a device that executes or hosts the elevation service such as a server computer. The elevation data request can also be created by the user device via interactions with an application programming interface ("API"), portal, or other functionality exposed by the server computer. Thus, the user device may not send the elevation data request as such in all embodiments.

The elevation service can be configured to obtain, from one or more Internet service providers, router data. The router data can define, for one or more routers, a geographic location of the router and an elevation of the router at the geographic location. The elevation service can be configured to generate, based on the router data, router location data that can include router identifiers (e.g., security set identifiers ("SSIDs"), media access control ("MAC") addresses, Internet Protocol ("IP") addresses, and the like) and associated elevation information for the routers. The elevation service can receive or detect the elevation data request associated with the user device, determine routers in proximity to the user device based on the elevation data request, query the router location data to identify elevations of the identified routers, and determine, based on the measured signal strengths from the elevation data request, an elevation of the user device (e.g., using triangulation, estimates, or the like).

The elevation service can generate the elevation data and provide the elevation data to the user device or other requestor. The user device can determine, based on the elevation data, its elevation. If the user device is able at any time to determine its elevation at a high degree of accuracy (e.g., using a global positioning system ("GPS") receiver with a strong satellite fix), the user device can provide, to the elevation service, a location data update that can define the elevation of the user device, and the elevation service can be configured to error check and/or update the elevation of the user device based on the location data update. In some embodiments, the user device can be configured to generate an elevation cookie, a hopping token, or other sharable and/or propagating data file (hereinafter collectively referred to as an "elevation cookie"). The elevation cookie can define the elevation of the user device and can be provided to other devices (e.g., a visiting device located at the geographic location) to inform the devices about the current elevation.

In some embodiments of the concepts and technologies disclosed herein, the elevation service can be configured to obtain building data and/or signal data. The elevation service can be configured to generate, based on the building data, the signal data, locations of the user device, elevations of the user device, and/or other information, one or more signal strength models. The elevation service can be configured to determine an elevation of the user device at any time based on the signal strength models by obtaining a location and signal strength for the user device.

According to one aspect of the concepts and technologies disclosed herein, a system is disclosed. The system can include a processor and a memory. The memory can store computer-executable instructions that, when executed by the processor, cause the processor to perform operations. The operations can include generating router location data that can include an identifier that can identify a router that is located at a geographic location and data that can specify an elevation at which the router is located at the geographic location; and detecting an elevation data request that can identify the router. The elevation data request can be associated with a user device. The operations further can include querying the router location data to determine the elevation at which the router is located; generating, based on the elevation at which the router is located, elevation data that can indicate the elevation at which the router is located; and sending, to the user device, the elevation data.

In some embodiments, generating the router location data can include obtaining, from an Internet service provider, router data, where the router data can include router identification data that can indicate the identifier and router elevation data that can define the elevation at which the router is located; generating, based on the router data, the router location data; and storing, at a data store, the router location data. In some embodiments, the elevation data request can be received from the user device. In some embodiments, the elevation data request can be created by the user device via functionality exposed by a server computer, where the functionality can include one of an application programming interface or a portal. In some embodiments, the router can include a WiFi router, the identifier can include a service set identifier associated with the WiFi router, and the WiFi router can communicate with a wide area network, such as, for example, the Internet, via the Internet service provider.

In some embodiments, the operations can further include obtaining, from a network device associated with a network, signal data that can define two or more signal strengths between the network device and the user device, where the two or more signal strengths can be measured as the user device moves through a building located at the geographic location; obtaining, from a data source, building data that can identify an interior of the building located at the geographic location; generating, based on the signal data and the building data, a signal strength model that can model the two or more signal strengths inside the building located at the geographic location; and storing the signal strength model. In some embodiments, the operations can further include receiving a further elevation data request from the user device; obtaining another instance of signal data, the other instance of signal data defining a current signal strength between the network device and the user device; generating, by providing the signal data to the signal strength model as input, a further instance of elevation data; and providing the further instance of elevation data to the user device.

In some embodiments, providing the elevation data to the user device can include providing, to the user device, an elevation cookie that can include information that can define the elevation. The user device can be configured to provide the elevation cookie to a visiting device located at the geographic location to enable the visiting device to determine the elevation. In some embodiments, the user device can be configured to generate an elevation cookie that can include a jumping token that can define the elevation. The user device can be configured to provide the elevation cookie to a visiting device located at the geographic location to enable the visiting device to determine the elevation.

According to another aspect of the concepts and technologies disclosed herein, a method is disclosed. The method can include generating, at a computing device that includes a processor, router location data that can include an identifier that can identify a router that is located at a geographic location and data that can specify an elevation at which the router is located at the geographic location. The method also can include detecting, by the processor, an elevation data request that can identify the router. The elevation data request can be associated with a user device. The method further can include querying, by the processor, the router location data to determine the elevation at which the router is located; generating, by the processor and based on the elevation at which the router is located, elevation data that can indicate the elevation at which the router is located; and sending, by the processor and directed to the user device, the elevation data.

In some embodiments, generating the router location data can include obtaining, from an Internet service provider, router data, where the router data can include router identification data that can indicate the identifier and router elevation data that can define the elevation at which the router is located; generating, based on the router data, the router location data; and storing, at a data store, the router location data. In some embodiments, the elevation data request can be received from the user device. In some embodiments, the elevation data request can be created by the user device via functionality exposed by a server computer, where the functionality can include one of an application programming interface or a portal. In some embodiments, the router can include a WiFi router, the identifier can include a service set identifier associated with the WiFi router, and the WiFi router can communicate with a wide area network, such as the Internet, via the Internet service provider.

In some embodiments, the operations can further include obtaining, from a network device associated with a network, signal data that can define two or more signal strengths between the network device and the user device, where the two or more signal strengths can be measured as the user device moves through a building located at the geographic location; obtaining, from a data source, building data that can identify an interior of the building located at the geographic location; generating, based on the signal data and the building data, a signal strength model that can model the two or more signal strengths inside the building located at the geographic location; and storing the signal strength model. In some embodiments, the operations can further include receiving a further elevation data request from the user device; obtaining another instance of signal data, the other instance of signal data defining a current signal strength between the network device and the user device; generating, by providing the signal data to the signal strength model as input, a further instance of elevation data; and providing the further instance of elevation data to the user device.

In some embodiments, providing the elevation data to the user device can include providing, to the user device, an elevation cookie that can include information that can define the elevation. The user device can be configured to provide the elevation cookie to a visiting device located at the geographic location to enable the visiting device to determine the elevation. In some embodiments, the user device can be configured to generate an elevation cookie that can include a jumping token that can define the elevation. The user device can be configured to provide the elevation cookie to a visiting device located at the geographic location to enable the visiting device to determine the elevation.

According to yet another aspect of the concepts and technologies disclosed herein, a computer storage medium is disclosed. The computer storage medium can store computer-executable instructions that, when executed by a processor, cause the processor to perform operations. The operations can include generating router location data that can include an identifier that can identify a router that is located at a geographic location and data that can specify an elevation at which the router is located at the geographic location; and detecting an elevation data request that can identify the router. The elevation data request can be associated with a user device. The operations further can include querying the router location data to determine the elevation at which the router is located; generating, based on the elevation at which the router is located, elevation data that can indicate the elevation at which the router is located; and sending, to the user device, the elevation data.

In some embodiments, generating the router location data can include obtaining, from an Internet service provider, router data, where the router data can include router identification data that can indicate the identifier and router elevation data that can define the elevation at which the router is located; generating, based on the router data, the router location data; and storing, at a data store, the router location data. In some embodiments, the elevation data request can be received from the user device. In some embodiments, the elevation data request can be created by the user device via functionality exposed by a server computer, where the functionality can include one of an application programming interface or a portal. In some embodiments, the router can include a WiFi router, the identifier can include a service set identifier associated with the WiFi router, and the WiFi router can communicate with a wide area network such as the Internet via the Internet service provider.

In some embodiments, the operations can further include obtaining, from a network device associated with a network, signal data that can define two or more signal strengths between the network device and the user device, where the two or more signal strengths can be measured as the user device moves through a building located at the geographic location; obtaining, from a data source, building data that can identify an interior of the building located at the geographic location; generating, based on the signal data and the building data, a signal strength model that can model the two or more signal strengths inside the building located at the geographic location; and storing the signal strength model. In some embodiments, the operations can further include receiving a further elevation data request from the user device; obtaining another instance of signal data, the other instance of signal data defining a current signal strength between the network device and the user device; generating, by providing the signal data to the signal strength model as input, a further instance of elevation data; and providing the further instance of elevation data to the user device.

In some embodiments, providing the elevation data to the user device can include providing, to the user device, an elevation cookie that can include information that can define the elevation. The user device can be configured to provide the elevation cookie to a visiting device located at the geographic location to enable the visiting device to determine the elevation. In some embodiments, the user device can be configured to generate an elevation cookie that can include a jumping token that can define the elevation. The user device can be configured to provide the elevation cookie to a visiting device located at the geographic location to enable the visiting device to determine the elevation.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The following detailed description is directed to determining and using elevation of a user device. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including handheld devices, multiprocessor systems, microprocessor-based or programmable consumer electronics, minicomputers, mainframe computers, and the like.

Figure 1:
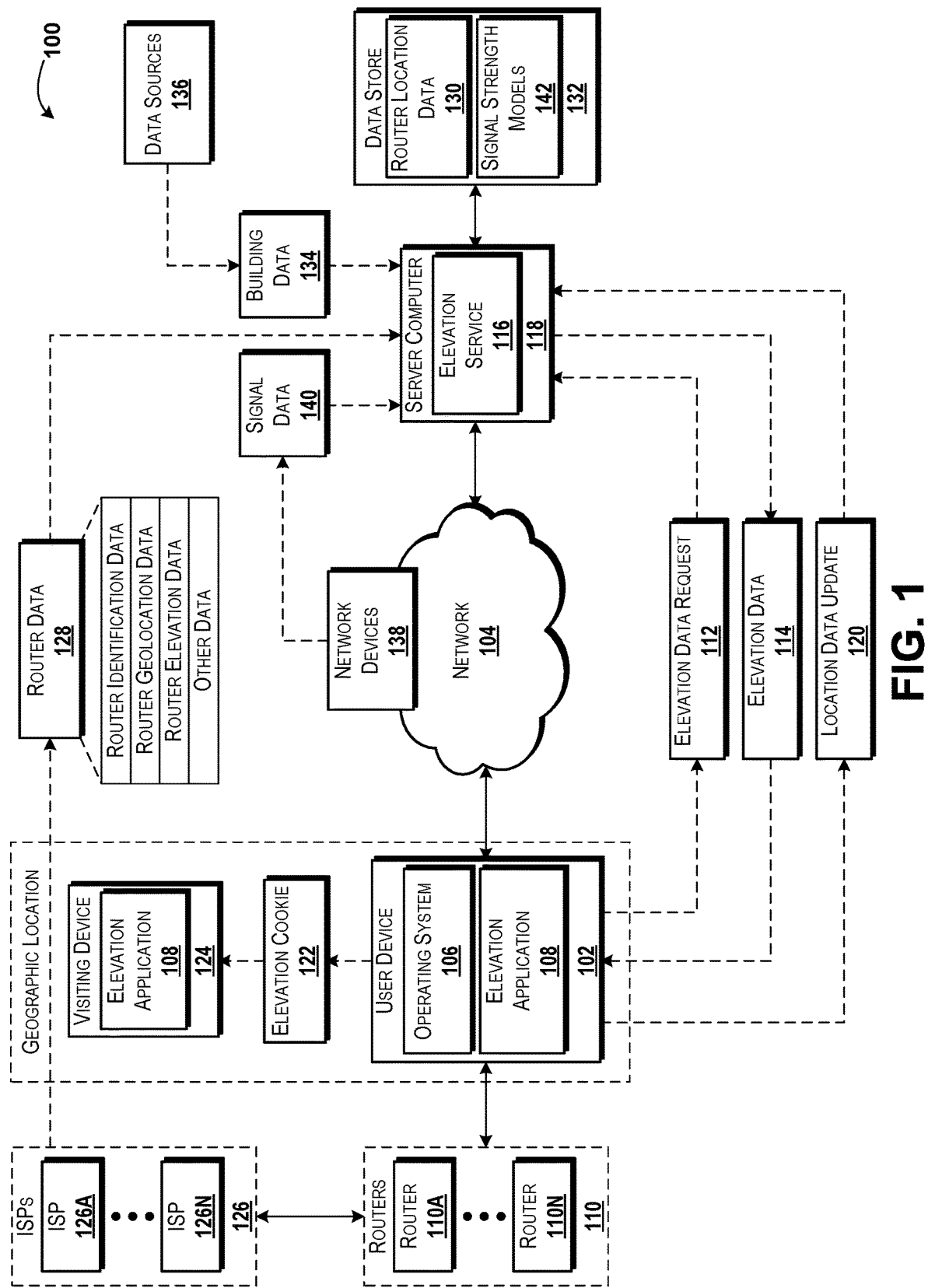
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for determining and using elevation of a user device will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more server computers, desktop computers, mobile telephones, laptop computers, set-top boxes, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, an elevation application 108. The operating system 106 can include a computer program that can control the operation of the user device 102. The elevation application 108 can include an executable program that can be configured to execute on top of the operating system 106 to provide various functions as illustrated and described herein for determining and using elevation of a user device 102.

The elevation application 108 can be configured to detect a need, desire, or other use for an elevation determination associated with the user device 102, e.g., a determination as to a current elevation of the user device 102. In various embodiments of the concepts and technologies disclosed herein, the user device 102 may not include an altimeter or other elevation sensor, and the elevation application 108 can be configured to perform various operations as illustrated and described herein for determining the elevation of the user device 102 without an altimeter or other elevation or altitude sensor.

According to various embodiments of the concepts and technologies disclosed herein, the elevation application 108 can activate one or more receivers and/or transceivers of the user device 102 (not illustrated in FIG. 1, but shown in FIG. 8 below) to detect one or more local routers 110A-N (hereinafter collectively and/or generically referred to as "routers 110"). As used herein, a "router" such as the router 110 can include a router, hotspot, or other networking-capable device that can operate using the Wi-Fi® brand of wireless technologies such as the 802.11a/b/g/n family of communication protocols, and the like. According to various embodiments of the concepts and technologies disclosed herein, and in the claims unless specifically recited as being included, the routers illustrated and described herein do not include location beacons, or the like. It should be understood that this example is illustrative, and therefore should not be construed as being limiting in any way.

Thus, the user device 102 can be configured, e.g., via execution of the elevation application 108, to activate a Wi-Fi transceiver and survey radio signals to collect a list of SSIDs or other identifying information for routers 110 that are in proximity to the user device 102. As used herein with regard to routers 110, the word "proximity" can be used to refer to routers 110 that are within communication range of the user device 102 via Wi-Fi signals. In compiling a list of one or more routers 110 in proximity to the user device 102, the elevation application 108 can measure one or more signal strengths between the user device 102 and the one or more routers 110. Thus, the elevation application 108 can compile a list, table, or other data structure that includes one or more routers 110 (e.g., SSIDs associated with the routers 110) and one or more signal strengths for signals exchanged by the user device 102 and the one or more routers 110. It should be understood that this example is illustrative, and therefore should not be construed as being limiting in any way.

In some embodiments, the elevation application 108 can be configured to identify the one or more routers 110 and then measure signal strengths one at a time between the user device 102 and the routers 110. In some other embodiments, the elevation application 108 can be configured to measure the signal strengths when identifying the routers 110. Still further, in some embodiments of the concepts and technologies disclosed herein the signal strengths may not be used or measured by the elevation application 108. As such, it should be understood that the illustrated and described embodiment is illustrative and should not be construed as being limiting in any way.

The elevation application 108 can further be configured to generate an elevation data request 112 and/or to request elevation data 114 from an elevation service 116 or other service, application, or the like. According to various embodiments of the concepts and technologies disclosed herein, the elevation service 116 can be hosted and/or executed by an application server, a web server, or other server computer 118. In the illustrated embodiment, the server computer 118 will be described as an application server. It should be understood that this example is illustrative, and therefore should not be construed as being limiting in any way.

The functionality of the elevation service 116 for receiving the elevation data request 112 and generating and providing the elevation data 114 in response to the elevation data request 112 will be described in additional detail below after introducing additional components of the operating environment 100 shown in FIG. 1. It should be noted, however, that the user device 102 can receive the elevation data 114, which can identify, inter alia, the elevation of the user device 102 and determine, based on the elevation data 114, the elevation and/or altitude of the user device 102 for various purposes. It should be understood that this example is illustrative, and therefore should not be construed as being limiting in any way.

The elevation application 108 also can be configured to generate one or more location data updates 120. In particular, if the user device 102 is able to determine its altitude and/or elevation using a sensor or the like (e.g., a GPS receiver), the user device 102 can be configured, e.g., via execution of the elevation application 108, to generate the location data update 120 to inform the server computer 118 as to the current verified elevation of the user device 102. The elevation service 116 can be configured to use the location data update 120 to error check and/or update the elevation calculations of the elevation service 116 in some embodiments. It should be understood that this example is illustrative, and therefore should not be construed as being limiting in any way.

The elevation application 108 can also be configured to generate an elevation cookie 122 or other data file that can define the current elevation of the user device 102. In various embodiments, the elevation cookie 122 can be shared by the user device 102 with one or more other devices in proximity to the user device 102 that indicate a desire to receive the elevation cookie 122. In various embodiments of the concepts and technologies disclosed herein, a visiting device 124 can be located in proximity to the user device 102 (e.g., at a geographic location) and can execute a copy of the elevation application 108. The visiting device 124 can be configured, e.g., via execution of the elevation application 108, to request an elevation cookie 122 from any devices in proximity to the visiting device 124. In various embodiments of the concepts and technologies disclosed herein, the elevation application 108 can be configured to poll or otherwise identify devices and/or entities in proximity to the executing device (e.g., the user device 102 and/or the visiting device 124 illustrated in FIG. 1) that are capable of providing the elevation cookie 122, and to obtain the elevation cookie 122. The elevation cookie 122 can identify the elevation of the user device 102 or other device that provides the elevation cookie 122. It should be understood that this example is illustrative, and therefore should not be construed as being limiting in any way.

As is generally understood, the routers 110 can be configured to enable, for devices connected thereto, Internet access via one or more Internet service providers 126A-N (hereinafter collectively and/or generically referred to as Internet service providers 126 and labeled in FIG. 1 as "ISPs 126"). Because the Internet connectivity of the routers 110 can be enabled by the Internet service providers 126, it can be appreciated that the Internet service providers 126 can be aware of the geographic location and/or elevation of the routers 110. In some embodiments, for example, activation of a router 110 by a customer or technician may require or include specification of an elevation or altitude at which the router 110 is operating. Regardless of when and how the elevation of the routers 110 is determined and/or learned, it should be understood that the Internet service providers 126 can be aware of the elevation and/or altitude at which one or more routers 110 are located. It should be understood that this example is illustrative, and therefore should not be construed as being limiting in any way.

The one or more Internet service providers 126 can be configured to provide router data 128 to the elevation service 116. The router data 128 can include, but is not limited to, router identification data, router geolocation data, router elevation data, and other data. The router identification data can identify a router 110 and can include, for example, an IP address associated with the router 110, a MAC address associated with the router 110, an SSID associated with the router 110, and/or other identifying information associated with the router 110. It can be appreciated that in some embodiments of the concepts and technologies disclosed herein, the identifying information can identify the router 110 by an identity as detected and/or detectable from the perspective of the Internet service provider 126 (e.g., an IP address or the like) and/or an identity as detected and/or detectable to a device (e.g., the user device 102) connecting to the router (e.g., an SSID, or the like). It should be understood that this example is illustrative, and therefore should not be construed as being limiting in any way.

The router geolocation data can identify a geographic location associated with the router 110. Thus, the router geolocation data can identify a street address, GPS coordinates, and/or other geographic location data, which can be specified in various levels of specificity. Thus, it can be appreciated that in some embodiments the router geolocation data can define the geographic location of the router 110 to a high level of accuracy and/or specificity (e.g., one meter or less of accuracy) and/or a low level of accuracy and/or specificity (e.g., five, ten, or even fifteen meters or more). Because the router geolocation data can be defined at any level of specificity and/or accuracy, it should be understood that these examples are illustrative, and therefore should not be construed as being limiting in any way.

The router elevation data can identify an elevation associated with the router 110. Thus, the router geolocation data can identify a floor of a house, building, or the like, at which the router 110 is located. Additionally, or alternatively, the router elevation data can define an altitude at which the router 110 is located (e.g., two hundred forty feet above sea level). Thus, it can be appreciated that in some embodiments the router elevation data can define a story or floor of a building on which the router 110 is located, while in some other embodiments the router elevation data can define an actual elevation and/or altitude at which the router 110 is located. Because the router elevation data can be defined in additional and/or alternative manners, it should be understood that these examples are illustrative, and therefore should not be construed as being limiting in any way.

The other data can define additional information about the router 110 such as, for example, a user, owner, or other entity associated with the router 110; a room or apartment number associated with the router 110; and/or other information associated with the router 110. The other data can also include other information as illustrated and described herein and therefore these examples are illustrative and should not be construed as being limiting in any way.

The elevation service 116 can be configured to obtain the router data 128 at various times. In some embodiments, the elevation service 116 can be configured to obtain the router data 128 when the Internet service providers 126 detect a change in location and/or elevation associated with one or more of the routers 110; at regular and/or irregular increments of time; and/or at other times. The elevation service 116 can be configured to receive the router data 128 and to identify, based on the router data 128, one or more of the routers 110 and a respective location and elevation associated with each of the one or more routers 110. The elevation service 116 can be configured to generate one or more data structures such as a table, database, or the like. The data structure can identify the one or more routers and their respective locations and elevations, among other information. This information can be stored by the elevation service 116 as router location data 130.

The router location data 130 can be stored in a data storage location or device accessible to the server computer 118 such as, for example, a data store 132. The functionality of the data store 132 can be provided by one or more databases, server computers, desktop computers, mobile telephones, laptop computers, virtual data storage devices and/or resources, other computing systems, and the like. In the illustrated embodiments, the functionality of the data store 132 will be described as being provided by a data server. As will be explained in more detail herein, the router location data 130 can be stored, updated, accessed, and/or used by the elevation service 116 to determine an elevation of the user device 102 and/or other devices upon request. It should be understood that this example is illustrative, and therefore should not be construed as being limiting in any way.

In some embodiments of the concepts and technologies disclosed herein, the elevation service 116 also can be configured to receive data from other devices and/or entities. In some embodiments, for example, the elevation service 116 can be configured to obtain building data 134 from one or more data sources 136. The building data 134 can include, for example, blueprints, models, and/or other information that can define a building and/or various aspects thereof (e.g., an interior of the building, an exterior of the building, and the like). The building data 134 can be used in association with the router data 128 and/or other information such as signal data 140, which can be provided to and/or obtained by the elevation service 116 from one or more network devices 138.

The network devices 138 can include various hardware, software, and/or other entities associated with a wireless communications network such as a cellular network, or the like, illustrated in FIG. 1 as the network 104 and/or a portion thereof. In various implementations of the concepts and technologies disclosed herein, the network devices 138 can include one or more components of a radio access network ("RAN") such as radios, antennas, antenna arrays, etc. It can be appreciated that these and/or other components of a RAN can be configured to generate, send, receive, and/or measure signals sent and/or received. It should be understood that this example is illustrative, and therefore should not be construed as being limiting in any way.

According to various embodiments, the signal data 140 can include, but is not limited to, signal measurements collected by the network devices 138, the signal measurements corresponding to signal strength and/or other signal quality metrics for a signal between the network devices 138 (e.g., a tower, antennas, etc.) and the user device 102 at one or more times. According to various embodiments of the concepts and technologies disclosed herein, the elevation service 116 can be configured to analyze the signal data 140 and the building data 134 in accordance with geolocation data associated with the user device 102. This analysis can be performed by the elevation service 116 to track signal strength changes based on movements of the user device 102 at a particular geographic location and/or in a particular building at the geographic location. It should be understood that this example is illustrative, and therefore should not be construed as being limiting in any way.

More particularly, in various embodiments of the concepts and technologies disclosed herein, the signal data 140 can further be analyzed in association with the building data 134 and one or more elevation determinations by the elevation service 116 (e.g., for the user device 102) to correlate signal strength changes at various locations to changes in elevation of the user device 102 and/or movements within a building at the geographic location. The elevation service 116 can apply various machine learning and/or artificial intelligence technologies to the determined elevations, the building data 134, and/or the signal data 140 to create one or more signal strength models 142. The signal strength models 142 can model and/or represent signal strength changes for signals to and from the user device 102 based on elevation changes of the user device 102 and/or other devices at a particular geographic location and/or within a building located at the geographic location. It should be understood that this example is illustrative, and therefore should not be construed as being limiting in any way.

The signal strength models 142 can be used by the elevation service 116 to determine elevation of the user device 102 in addition to, and/or instead of, the router location data 130 illustrated and described herein. Thus, in some embodiments of the concepts and technologies disclosed herein, the elevation service 116 can be configured to receive an elevation data request 112 from the user device 102 and/or another entity, to obtain signal data 140 relating to the user device 102 (the elevation service 116 can request the signal data 140 and/or can instruct other devices to collect the signal data 140) and determine, based on the signal data 140 and the signal strength models 142, an elevation of the user device 102. The elevation service 116 can generate the elevation data 114 and provide the elevation data 114 to the requestor. Thus, it can be appreciated that the elevation service 116 can be configured to determine an elevation of a user device 102 using router location data 130 and/or the signal strength models 142, in addition to other technologies as illustrated and described herein. It should be understood that this example is illustrative, and therefore should not be construed as being limiting in any way.

In practice, a device such as a user device 102 can be located at a geographic location. The user device 102 can be configured to execute an elevation application 108 as a stand-alone application, as part of another application, and/or as part of the operating systems 106. The elevation application 108 can be configured to detect, at substantially any time, a use for an elevation determination (e.g., to determine a current elevation or altitude of the user device 102). In some contemplated embodiments of the concepts and technologies disclosed herein, the use for the elevation determination can include, but is not limited to, navigation purposes, emergency calls (e.g., an E911 call), for data collection purposes, combinations thereof, or the like.

In some embodiments of the concepts and technologies disclosed herein, the user device 102 can generate an elevation data request 112 that requests an elevation determination from the elevation service 116 without any further analysis at the user device 102. In some other embodiments of the concepts and technologies disclosed herein, the elevation application 108 can be configured to collect router information before generating the elevation data request 112. In particular, the elevation application 108 can be configured to detect one or more routers 110 in proximity to the user device 102 and to measure signal strengths between the user device 102 and the one or more routers 110, with the elevation application 108 including, in the elevation data request 112, data that identifies the one or more routers 110 and one or more measured signal strengths between the user device 102 and the one or more routers 110. In either event, the user device 102 can send the elevation data request 112 to the elevation service 116 (or a device that executes or hosts the elevation service 116 such as the server computer 118). It should be understood that in some embodiments, the elevation data request 112 can be created via an API, a portal, or other functionality exposed by the server computer 118 and therefore the user device 102 may not send the elevation data request 112 as such. It should be understood that these examples are illustrative, and therefore should not be construed as being limiting in any way.

The elevation service 116 can be configured to obtain, from one or more Internet service providers 126 router data 128. The router data 128 can define, for one or more routers 110 a geographic location of the router 110 and an elevation of the router 110 at the geographic location. The elevation service 116 can be configured to generate, based on the router data 128, router location data 130 that can include router identifiers (e.g., SSIDs, MAC addresses, IP addresses, and the like) and associated elevation information for the routers 110. The elevation service 116 can receive or detect the elevation data request 112 associated with the user device 102, determine routers 110 in proximity to the user device 102 based on the elevation data request 112, query the router location data 130 to identify elevations of the identified routers 110, and determine, based on the measured signal strengths from the elevation data request 112, an elevation of the user device 102. It can be appreciated that in some embodiments of the concepts and technologies disclosed herein, the elevation determination may be most accurate if three or more routers 110 and associated signal strengths are included in the elevation data request 112 (e.g., so triangulation can be performed by the elevation service 116). It should be understood, however, that that the elevation service 116 can be configured to determine elevation based on even one identified router 110 and signal strength, e.g., by determining a range of elevations. For example, if the measured signal strength indicates that the user device 102 is ten feet from a particular router located at an elevation of sixty-five feet, the elevation service 116 can determine the elevation of the user device 102 as being in a range of fifty-five feet to seventy-five feet. It should be understood that this example is illustrative, and therefore should not be construed as being limiting in any way.

The elevation service 116 can generate the elevation data 114 and provide the elevation data 114 to the user device 102 or other requestor. The user device 102 can determine, based on the elevation data 114, its elevation. If the user device 102 is able at any time to determine its elevation at a high degree of accuracy (e.g., using a GPS receiver with a strong satellite fix), the user device 102 can provide, to the elevation service 116, a location data update 120 that defines the elevation of the user device 102, and the elevation service 116 can be configured to error check and/or update the elevation of the user device 102 based on the location data update 120. It should be understood that this example is illustrative, and therefore should not be construed as being limiting in any way.

In some embodiments, the user device 102 can be configured to generate an elevation cookie 122. The elevation cookie 122 can define the elevation of the user device 102 (e.g., as determined by the user device 102 based on the elevation data 114 and/or based on GPS, or the like). The elevation cookie 122 can be provided to other devices (e.g., a visiting device 124) to inform the devices about the current elevation. It should be understood that this example is illustrative, and therefore should not be construed as being limiting in any way.

In some embodiments, the elevation service 116 can be configured to obtain building data 134 and/or signal data 140 and to generate, based on the building data 134, the signal data 140, locations of the user device 102, elevations of the user device 102, and/or other information, signal strength models 142. The elevation service 116 can be configured to determine an elevation of the user device 102 at any time based on the signal strength models 142 by obtaining a location and signal strength for the user device 102. It should be understood that this example is illustrative, and therefore should not be construed as being limiting in any way.

Although not visible in FIG. 1, some embodiments of the concepts and technologies disclosed herein provide another approach determining elevation for the user device 102. In particular, the user device 102 can be configured (e.g., via execution of the elevation application 108) to query a router 110 (e.g., a router 110 with which or via which the user device 102 communicates) to determine the IP address or other identifier associated with the router 110. Thus, for example, the user device 102 can be configured to send a request to the router 110 to request the IP address, MAC address, or the like associated with the router 110. The user device 102 can be configured to send the determined identifier (e.g., the IP address, MAC address, or the like) to the server computer 118 (e.g., as part of or instead of the elevation data request 112), and the server computer 118 (e.g., via executing the elevation service 116) can query the router location data 130, determine the elevation of the router 110, and provide the elevation to the user device 102 (e.g., as part of or instead of the elevation data 114). It should be understood that this example is illustrative, and therefore should not be construed as being limiting in any way.

FIG. 1 illustrates one user device 102, one network 104, two routers 110, one server computer 118, two Internet service providers 126, one data store 132, one instance of data sources 136, and one instance of network devices 138. It should be understood, however, that various implementations of the operating environment 100 can include one or more than one user device 102; one or more than one network 104; zero, one, two, or more than two routers 110; one or more than one server computer 118; zero, one, two, or more than two Internet service providers 126; zero, one, or more than one data store 132; zero, one, or more than one instance of data sources 136; and/or zero, one, or more than one instance of network devices 138. As such, the illustrated embodiment should be understood as being illustrative, and should not be construed as being limiting in any way.

Figure 2:
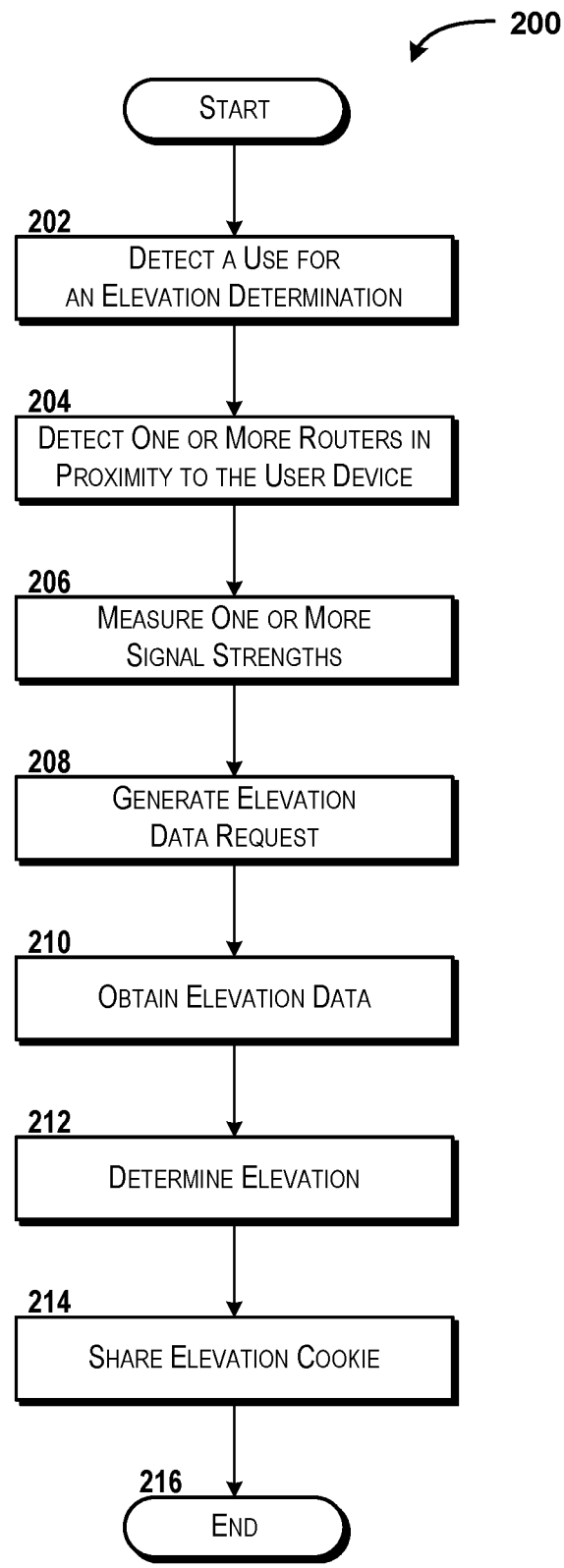
FIG. 2 is a flow diagram showing aspects of a method for determining and using elevation of a user device, according to an illustrative embodiment of the concepts and technologies described herein.

Turning now to FIG. 2, aspects of a method 200 for determining and using elevation of a user device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 118, to perform one or more operations and/or causing the processor to direct other components of the computing system or device to perform one or more of the operations.

For purposes of illustrating and describing the concepts of the present disclosure, the method 200 is described herein as being performed by the user device 102 via execution of one or more software modules such as, for example, the elevation application 108. It should be understood that additional and/or alternative devices and/or network nodes can provide the functionality described herein via execution of one or more modules, applications, and/or other software including, but not limited to, the elevation application 108. Thus, the illustrated embodiments are illustrative, and should not be viewed as being limiting in any way.

The method 200 begins at operation 202. At operation 202, the user device 102 can detect a use for an elevation determination. According to various embodiments of the concepts and technologies disclosed herein, the detected use for an elevation determination can include detecting a need for the elevation of the user device 102 (e.g., detecting commencement of an E911 or other emergency call, or the like), detecting a desire for an elevation (e.g., activating a mapping application or other application that uses or displays altitude or elevation of the user device 102), and/or other activity that indicates a desire or use for elevation data. Because the user device 102 can detect a use for an elevation determination in additional and/or alternative manners, it should be understood that these examples are illustrative, and therefore should not be construed as being limiting in any way.

From operation 202, the method 200 can proceed to operation 204. At operation 204, the user device 102 can detect one or more routers 110 in proximity to the user device 102. According to various embodiments of the concepts and technologies disclosed herein, the user device 102 can be configured to activate a receiver or transceiver and detect one or more routers 110 in communication range of the user device 102. In operation 204, the user device 102 can create a list of one or more SSIDs or other identifying information for the one or more routers 110. According to various embodiments of the concepts and technologies disclosed herein, the routers 110 identified in operation 204 operate using WiFi signals (e.g., signals generated and/or formatted in the 802.11 a/b/g/n and/or other protocols). It can be appreciated that the routers 110 can be connected to one or more Internet service providers 126 and that the Internet service providers 126 can be aware of the location of the routers 110, the elevation of the routers 110, and the identifiers associated with the router 110 (e.g., SSIDs, MAC addresses, IP addresses, etc.). It should be understood that this example is illustrative, and therefore should not be construed as being limiting in any way.

From operation 204, the method 200 can proceed to operation 206. At operation 206, the user device 102 can measure one or more signal strengths between the user device 102 and the one or more routers 110. In some embodiments of the concepts and technologies disclosed herein, the user device 102 can measure the signal strengths when surveying for routers in operation 204. In some other embodiments, the user device 102 can measure the signal strengths between the user device 102 and the one or more routers 110 at other times (e.g., one at a time). In some embodiments, measuring the signal strengths one at a time can be performed to ensure that the measured signal strengths are collected without interference (e.g., by measuring two or more signal strengths at the same time). It should be understood that this example is illustrative, and therefore should not be construed as being limiting in any way. In operation 206, the user device 102 can measure and record a signal strength between the user device 102 and each of the identified routers 110. The user device 102 can store, as part of operation 206, the identified routers 110 and associated signal strengths. It should be understood that this example is illustrative, and therefore should not be construed as being limiting in any way.

From operation 206, the method 200 can proceed to operation 208. At operation 208, the user device 102 can generate an elevation data request 112. In the illustrated embodiment of the method 200, the elevation data request 112 can include data that can identify the routers 110 (e.g., SSIDs, MAC addresses, IP addresses, etc.) and the measured signal strengths associated with each of the routers 110. In some embodiments of the operation 208, the user device 102 can send the elevation data request 112 to the elevation service 116. In some other embodiments of operation 208, the user device 102 can create the elevation data request 112 via an API, a portal, a service call, and/or other functionality (e.g., exposed by the server computer 118 or other device). Thus, it can be appreciated that operation 208 can include generating the elevation data request 112 and sending the elevation data request 112 in some embodiments.

From operation 208, the method 200 can proceed to operation 210. At operation 210, the user device 102 can obtain elevation data 114. In operation 210, the user device can obtain the elevation data 114 from the elevation service 116, according to various embodiments. It can be appreciated that the elevation service 116 can provide the elevation data 114 in response to the elevation data request 112 generated and/or sent to the elevation service 116 in operation 208. It should be understood that this example is illustrative, and therefore should not be construed as being limiting in any way.

From operation 210, the method 200 can proceed to operation 212. At operation 212, the user device 102 can determine the elevation. According to various embodiments of the concepts and technologies disclosed herein, the user device 102 can determine its elevation based on the elevation data 114. In some embodiments, the elevation data 114 can identify the elevation of the user device 102, so determining the elevation in operation 212 can correspond to the user device 102 extracting the elevation from the elevation data 114. In some other embodiments, the elevation data 114 can include one or more elevations of the routers 110 and the user device 102 can be configured to calculate its elevation using the elevation application 108 instead of receiving the elevation in the elevation data 114.

It therefore can be understood that in some embodiments the user device 102 can measure signal strengths between the user device 102 and the one or more routers 110 in operation 210 and the user device 102 can calculate its elevation based on measuring signal strengths between the user device 102 and the one or more routers 110 using the signal strengths (e.g., triangulating its location using preferably three or more routers 110, known elevations of the routers 110, and the measured signal strengths). It should be understood that this example is illustrative, and therefore should not be construed as being limiting in any way.

From operation 212, the method 200 can proceed to operation 214. At operation 214, the user device 102 can share an elevation cookie 122 with one or more devices or entities. As explained herein, the elevation cookie 122 can include a hopping token, or other sharable and/or propagating data file that can define the elevation of the user device. The elevation cookie 122 can be provided to other devices (e.g., the visiting device 124 located at the geographic location) to inform the other devices regarding the elevation at the geographic location. In some embodiments of the concepts and technologies disclosed herein, the elevation cookie 122 can be shared and propagated by any device located in proximity to the user device 102, as long as the device executes an instance of the elevation application 108. It should be understood that this example is illustrative, and therefore should not be construed as being limiting in any way.

Over time, the propagation of the elevation cookie 122 can be used to reduce load on the elevation service 116, to propagate elevation information to devices at a particular location, and/or for other reasons. Thus, the concepts and technologies disclosed herein can support crowd sourcing elevation information from and/or among devise in some embodiments. It should be understood that this example is illustrative, and therefore should not be construed as being limiting in any way.

From operation 214, the method 200 can proceed to operation 216. The method 200 can end at operation 216.

Figure 3:
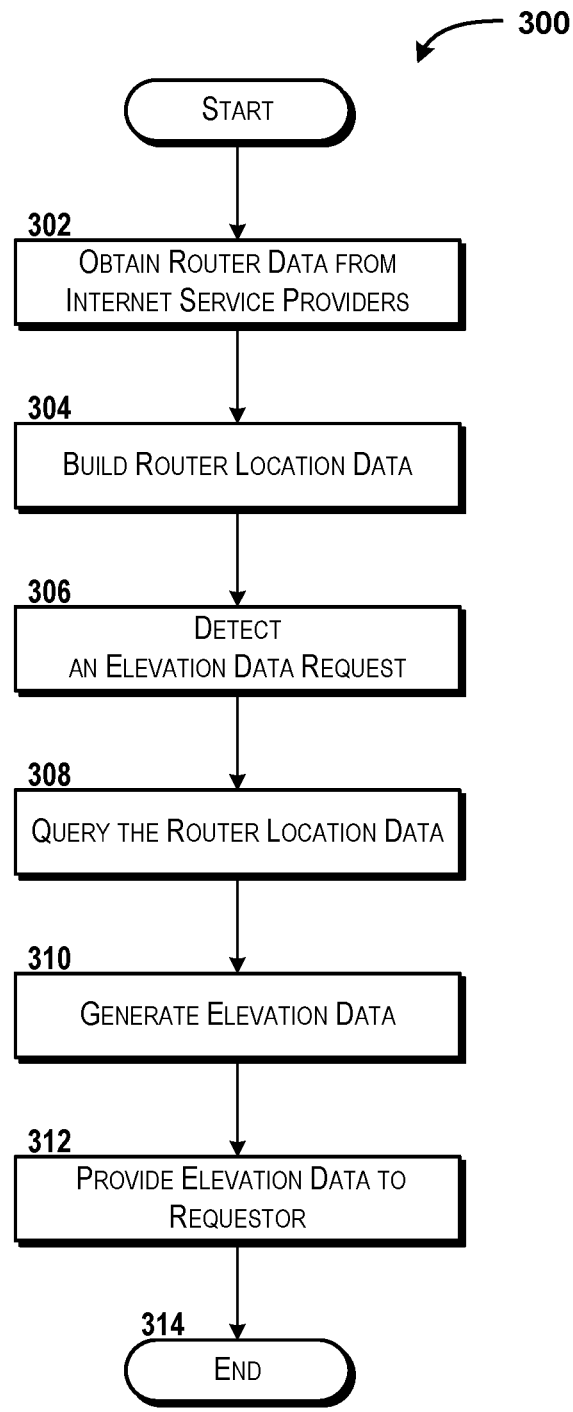
FIG. 3 is a flow diagram showing aspects of a method for providing elevation data to a requestor, according to an illustrative embodiment of the concepts and technologies described herein.

Turning now to FIG. 3, aspects of a method 300 for providing elevation data to a requestor will be described in detail, according to an illustrative embodiment. For purposes of illustrating and describing the concepts of the present disclosure, the method 300 is described herein as being performed by the server computer 118 via execution of one or more software modules such as, for example, the elevation service 116. It should be understood that additional and/or alternative devices and/or network nodes can provide the functionality described herein via execution of one or more modules, applications, and/or other software including, but not limited to, the elevation service 116. Thus, the illustrated embodiments are illustrative, and should not be viewed as being limiting in any way.

The method 300 begins at operation 302. At operation 302, the server computer 118 can obtain router data 128 from one or more Internet service providers 126. As explained above, the router data 128 can include, but is not limited to, router identification data, router geolocation data, router elevation data, and other data. The router identification data can identify a router 110 and can include, for example, an IP address, MAC address, SSID, or other identifying information associated with the router 110. The router geolocation data can identify a geographic location associated with the router 110. Thus, the router geolocation data can identify a street address, GPS coordinates, and/or other geographic location data that can identify the geographic location of the router 110.

The router elevation data can identify an elevation associated with the router 110 and can identify, for example, a floor of a house, building, or the like, at which the router 110 is located, an altitude at which the router 110 is located (e.g., two hundred forty feet above sea level), or another definition of elevation associated with the router 110. The other data can define additional information about the router 110 such as, for example, a user associated with the router 110, an owner of the router 110, the Internet service provider 126 that communicates with the router 110, other entities associated with the router 110, a room or apartment number associated with the router 110, and/or other information associated with the router 110. The other data can also include other information as illustrated and described herein and therefore these examples are illustrative and should not be construed as being limiting in any way.

From operation 302, the method 300 can proceed to operation 304. At operation 304, the server computer 118 can build the router location data 130. In operation 304, the server computer 118 can analyze the received router data 128 and identify, based on the analysis of the router data 128, one or more of the routers 110 and elevations at which each of the one or more routers 110 is located. In some embodiments, operation 304 can also include identifying the location of the routers 110 and including that information in the router location data 130, though this is not required in all embodiments. The elevation service 116 can be configured to generate one or more data structures such as a table, database, or the like, and store that data (identifying the one or more routers and their respective elevations) as the router location data 130. It should be understood that this example is illustrative, and therefore should not be construed as being limiting in any way.

From operation 304, the method 300 can proceed to operation 306. At operation 306, the server computer 118 can detect an elevation data request 112. It can be appreciated with reference to FIG. 2 that the elevation data request 112 detected in operation 306 can be generated at the server computer 118 in some embodiments. In some other embodiments, the elevation data request 112 can be received by the server computer 118 after being sent to the server computer 118 by the user device 102 and/or other devices. Because the elevation data request 112 can be obtained and/or detected in additional and/or alternative manners, it should be understood that these examples are illustrative, and therefore should not be construed as being limiting in any way.

From operation 306, the method 300 can proceed to operation 308. At operation 308, the server computer 118 can query the router location data 130. In particular, the server computer 118 can query the router location data 130 based on data included in the elevation data request 112 (e.g., a list of SSIDs, MAC addresses, IP addresses, and/or other identifiers; signal strengths; combinations thereof; or the like). In some embodiments, the server computer 118 can query the router location data 130 to determine, for each router 110 identified in the elevation data request 112, an associated elevation. It should be understood that this example is illustrative, and therefore should not be construed as being limiting in any way.

From operation 308, the method 300 can proceed to operation 310. At operation 310, the server computer 118 can generate the elevation data 114. In some embodiments, as noted above, the server computer 118 can be configured to calculate the elevation of the user device 102 in some embodiments based on the routers 110 and associated signal strengths (e.g., by triangulating the location (or probable location) of the user device 102) identified based on the elevation data request 112. Thus, operation 310 can correspond to the server computer 118 determining the elevation of the user device 102. It should be understood that this example is illustrative, and therefore should not be construed as being limiting in any way.

In some other embodiments, as explained above, the server computer 118 can be configured to provide the identified elevations of the identified routers 110 as identified in operation 308 to the user device 102. The user device 102 can be configured (e.g., via execution of the elevation application 108) to determine its elevation based on the elevations of the routers 110 and associated signal strengths (e.g., by triangulating its location or probable location). It should be understood that this example is illustrative, and therefore should not be construed as being limiting in any way.

From operation 310, the method 300 can proceed to operation 312. At operation 312, the server computer 118 can provide the elevation data 114 generated in operation 310 to the requestor (e.g., the user device 102 that generated the elevation data request 112). As can be appreciated from the above, the elevation data 114 provided in operation 312 can include data identifying an elevation of the user device 102 and/or data identifying one or more elevations associated with the one or more routers 110. It should be understood that these examples are illustrative, and therefore should not be construed as being limiting in any way.

From operation 312, the method 300 can proceed to operation 314. The method 300 can end at operation 314.

Figure 4:
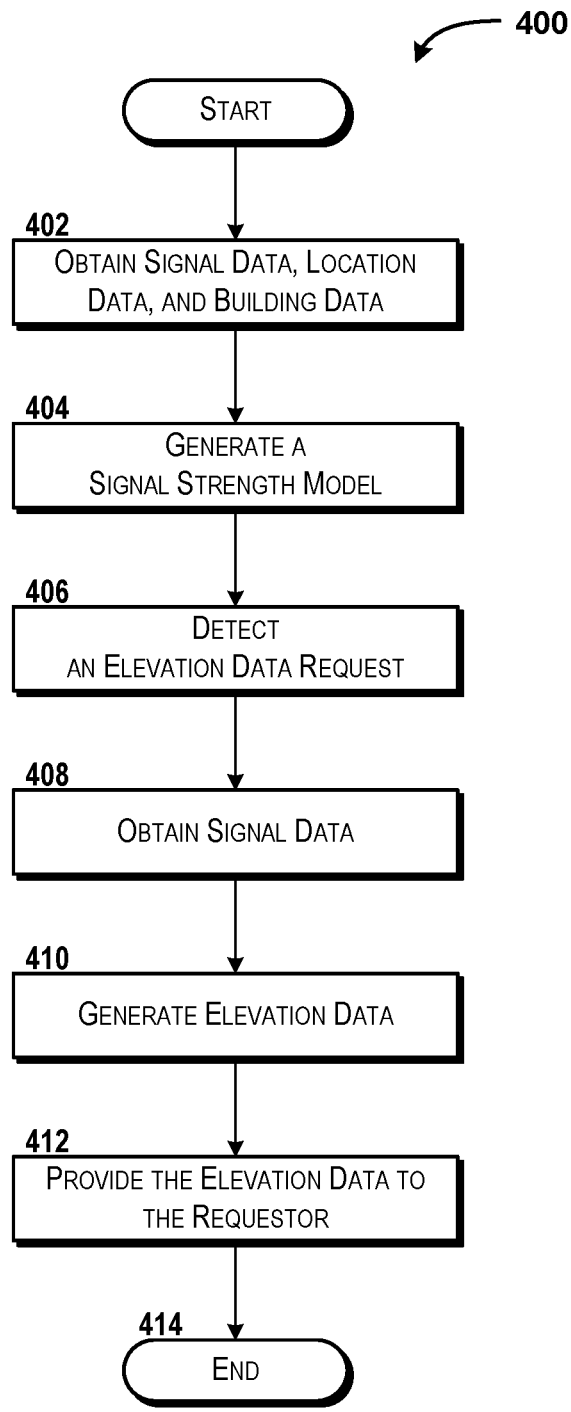
FIG. 4 is a flow diagram showing aspects of a method for providing elevation data to a requestor, according to another illustrative embodiment of the concepts and technologies described herein.

Turning now to FIG. 4, aspects of a method 400 for providing elevation data to a requestor will be described in detail, according to another illustrative embodiment. For purposes of illustrating and describing the concepts of the present disclosure, the method 400 is described herein as being performed by the server computer 118 via execution of one or more software modules such as, for example, the elevation service 116. It should be understood that additional and/or alternative devices and/or network nodes can provide the functionality described herein via execution of one or more modules, applications, and/or other software including, but not limited to, the elevation service 116. Thus, the illustrated embodiments are illustrative, and should not be viewed as being limiting in any way.

The method 400 begins at operation 402. At operation 402, the server computer 118 can obtain the building data 134, geolocation data (associated with the user device 102), and the signal data 140. The building data 134 can include, for example, blueprints, models, and/or other information that can define a building and/or various aspects thereof (e.g., an interior of the building, an exterior of the building, and the like) including at least elevations within the building. The signal data 140 can include, but is not limited to, signal measurements collected by one or more network devices 138 (e.g., antennas, radios, signal measurement devices, or the like), with the signal measurements corresponding to measured signal strengths and/or other signal quality metrics for a signal between the network devices 138 and the user device 102 at one or more times.

From operation 402, the method 400 can proceed to operation 404. At operation 404, the server computer 118 can generate a signal strength model 142 based on the data obtained in operation 402. In operation 404, the server computer 118 can determine one or more locations within the building in which a user device 102 is located. In particular, the server computer 118 can be configured to analyze the signal data 140 and the building data 134 in accordance with geolocation data associated with the user device 102. This analysis can be performed by the elevation service 116 to track signal strength changes based on movements of the user device 102 at a particular geographic location and/or in a particular building at the geographic location. It should be understood that this example is illustrative, and therefore should not be construed as being limiting in any way.

More particularly, in various embodiments of the concepts and technologies disclosed herein, the server computer 118 can analyze the signal data 140 in association with the building data 134 and one or more elevation determinations by the elevation service 116 (e.g., for the user device 102) to correlate signal strength changes at various geographic locations to changes in elevation of the user device 102 and/or movements within a building at the geographic location. The server computer 118 can be configured to apply various machine learning and/or artificial intelligence technologies to the determined elevations, the building data 134, and/or the signal data 140 to create one or more signal strength models 142. The signal strength models 142 can model and/or represent signal strength changes for signals to and from the user device 102 based on elevation changes of the user device 102 and/or other devices at a particular geographic location and/or within a building located at the geographic location. It should be understood that this example is illustrative, and therefore should not be construed as being limiting in any way.

From operation 404, the method 400 can proceed to operation 406. At operation 406, the server computer 118 can detect an elevation data request 112. The elevation data request 112 can be generated at the server computer 118 in some embodiments. In some other embodiments, the elevation data request 112 can be sent to the server computer 118 by the user device 102 or other device, and can be received by the server computer 118 in operation 406. Because the elevation data request 112 can be obtained and/or detected in additional and/or alternative manners, it should be understood that these examples are illustrative, and therefore should not be construed as being limiting in any way.

From operation 406, the method 400 can proceed to operation 408. At operation 408, the server computer 118 can obtain, from the network devices 138, signal data 140 associated with the user device 102. In some embodiments, the server computer 118 can request, from the network devices 138, the signal data 140. In some other embodiments, the server computer 118 can instruct other devices to collect the signal data 140 and/or prompt the network devices 138 to send the signal data 140 associated with the user device 102 to the server computer 118. Because the signal data 140 can be obtained in additional and/or alternative manners, it should be understood that this example is illustrative, and therefore should not be construed as being limiting in any way.

From operation 408, the method 400 can proceed to operation 410. At operation 410, the server computer 118 can generate elevation data 114. In operation 410, the server computer 118 can be configured to use the signal strength models 142 to determine an elevation of the user device 102 based on the signal data obtained in operation 408. In particular, the server computer 118 can provide the signal strengths and location as inputs to the signal strength models 142 and the output of the modeling process in operation 410 can correspond to an elevation of the user device 102. It should be understood that this example is illustrative, and therefore should not be construed as being limiting in any way.

From operation 410, the method 400 can proceed to operation 412. At operation 412, the server computer 118 can provide the elevation data 114 generated in operation 410 to the requestor (e.g., the user device 102). As can be appreciated from the above, the elevation data 114 provided in operation 412 can include data identifying an elevation of the user device 102. It should be understood that these examples are illustrative, and therefore should not be construed as being limiting in any way.

From operation 412, the method 400 can proceed to operation 414. The method 400 can end at operation 414.

Figure 5:
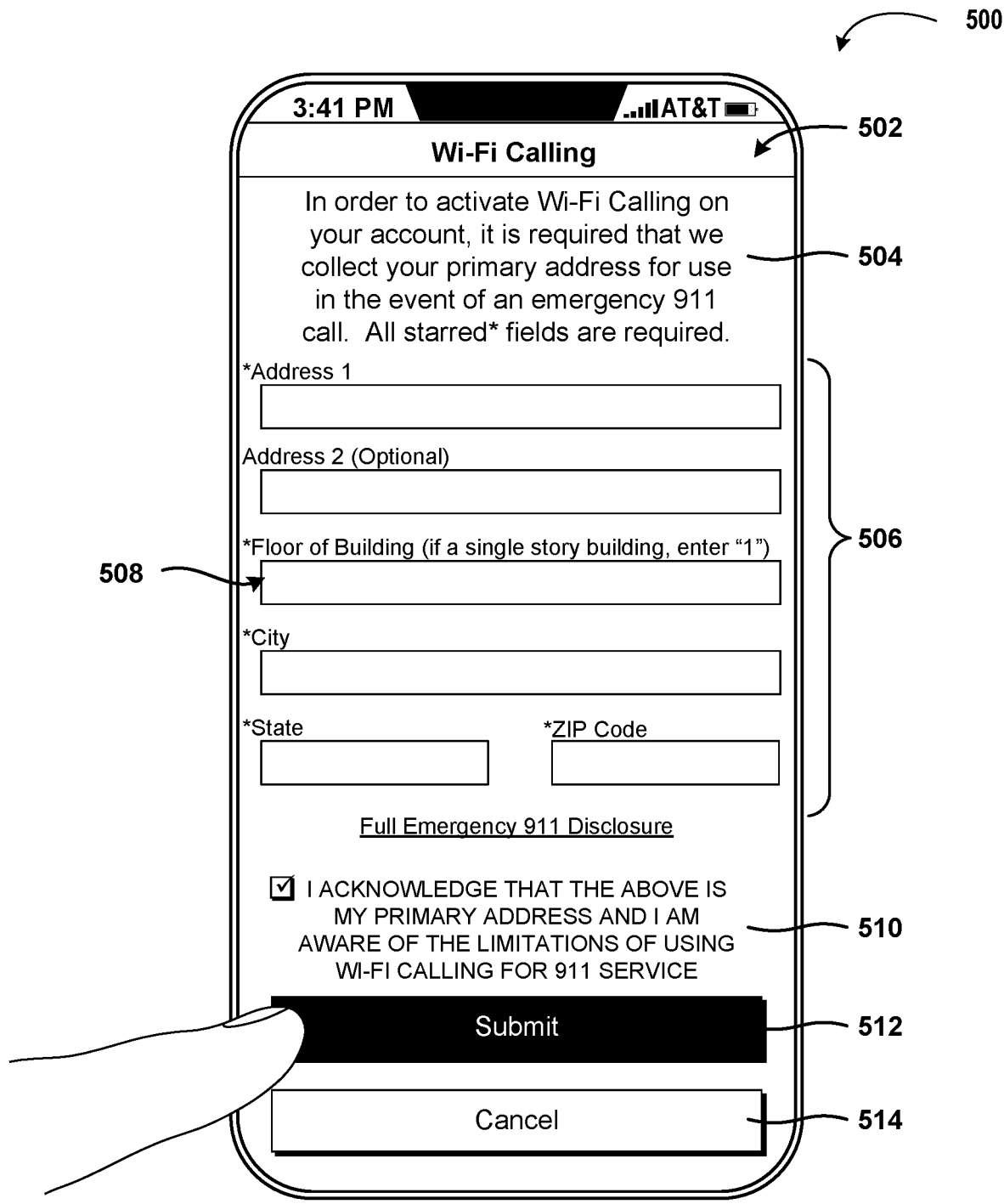
FIG. 5 is a user interface diagram showing a screen display for determining and using elevation of a user device, according to some illustrative embodiments of the concepts and technologies described herein.

FIG. 5 is a user interface ("UI") diagram showing some aspects of an example UI for using and/or interacting with an elevation application 108 and/or the elevation service 116, according to some illustrative embodiments. FIG. 5 shows an illustrative screen display 500. According to some embodiments of the concepts and technologies described herein, the screen display 500 can be generated by a device such as the user device 102 via interactions with the elevation application 108 and/or the elevation service 116.

In particular, according to various embodiments, the user device 102 can generate the screen display 500 and/or other screen displays in conjunction with and/or based upon interactions with the elevation application 108 described herein, which can be configured to render the screen display 500 using data generated at the user device 102. The elevation application 108 can be configured to provide data obtained via the screen display 500 to the elevation service 116 as illustrated and described herein. It should be appreciated that the UI diagram illustrated in FIG. 5 is illustrative of one contemplated example of the UIs that can be generated and/or displayed in accordance with the concepts and technologies disclosed herein, and therefore should not be construed as being limiting in any way.

According to various embodiments, the screen display 500 can be presented, for example, when a user of the user device 102 initializes and/or configures Wi-Fi calling features associated with the user device 102. Because the screen display 500 illustrated in FIG. 5 can be displayed at additional and/or alternative times, it should be understood that these examples are illustrative and therefore should not be construed as being limiting in any way.

The screen display 500 can include various menus and/or menu options (not shown in FIG. 5). The screen display 500 also can include an address and elevation entry window 502. The address and elevation entry window 502 can be configured to obtain a street address and elevation for emergency calling (e.g., E911 calls) and/or other purposes. The address and elevation entry window 502 can include an address and elevation entry prompt 504 that can explain why the address and elevation is needed. The address and elevation entry prompt 504 can provide context for the obtaining of the address and elevation being obtained by way of the address and elevation entry window 502. In the illustrated embodiment, the event information address and elevation entry prompt 504 includes an indication that the information is required to use Wi-Fi calling. It should be understood that this example is illustrative and therefore should not be construed as being limiting in any way.

As shown in FIG. 5, the address and elevation entry window 502 also includes an address entry form 506. The address entry form can provide various fields for entering a primary address for the user of the user device 102. The address entry form 506 also can include an elevation entry field 508. The elevation entry field 508 can be included to require a user or other entity to provide information that can be used to determine the elevation of the user device 102 and/or a router 110 located in a proximity of the user device 102. It should be understood that the illustrated address and elevation entry field 508 is illustrative and therefore should not be construed as being limiting in any way.

The address and elevation entry window 502 also can include a UI control 510 for acknowledging a disclaimer regarding address and elevation entry via the address and elevation entry window 502. Selection of the UI control 510 can be required in some embodiments to submit the data entered via the address and elevation entry via the address and elevation entry window 502, though this is not necessarily the case in all embodiments. The address and elevation entry window 502 also can include a UI control 512 to submit the data entered into the address and elevation entry window 502. Thus, for example, the user or other entity can select the UI control 512 to cause the user device 102 to provide the address and elevation entered using the address and elevation entry window 502 to the server computer 118 and/or other entities. The address and elevation entry window 502 also can include a UI control 514 to cancel providing the address and elevation obtained via the address and elevation entry window 502. Thus selection of the UI control 514 can cause the user device 102 to close the address and elevation entry window 502 when the user or other entity wishes to close the address and elevation entry window 502 and/or at other times at which the UI control 514 is selected. Because additional or alternative controls can be included in the address and elevation entry window 502, it should be understood that the example embodiment shown in FIG. 5 is illustrative and therefore should not be construed as being limiting in any way.

Figure 6:
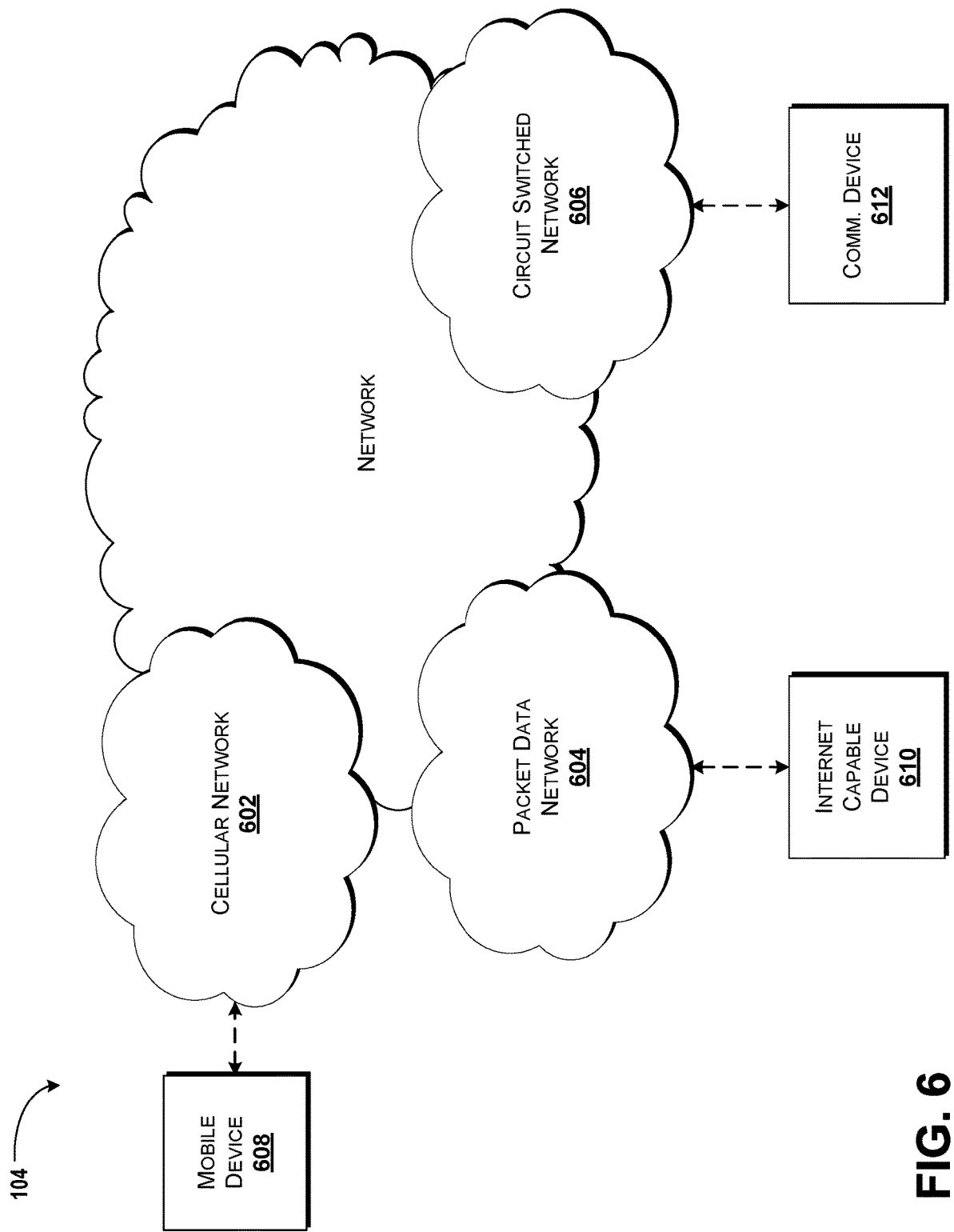
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards, 5G mobile communications standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
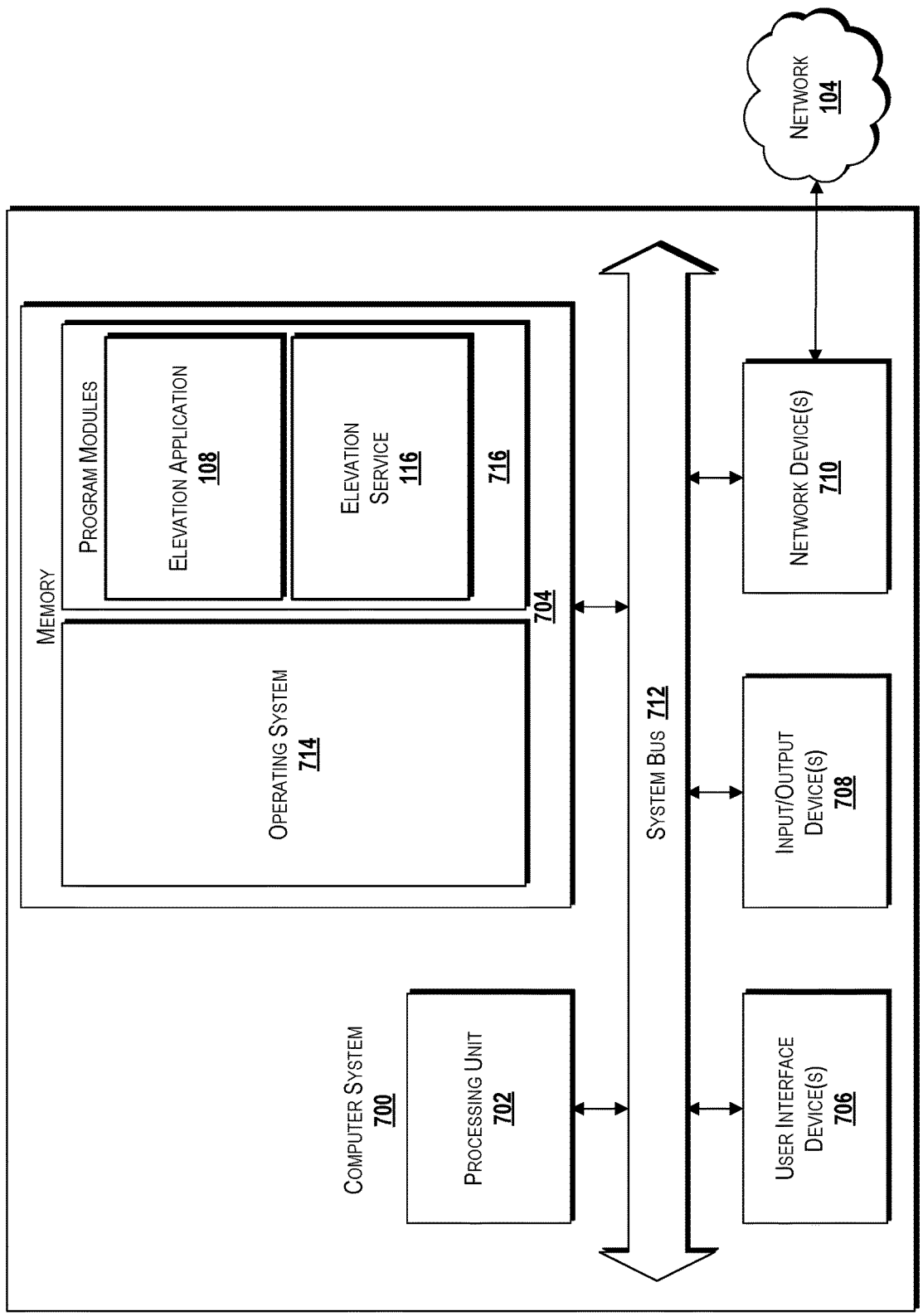
FIG. 7 is a block diagram illustrating an example computer system configured to support determining and using elevation of a user device, according to some illustrative embodiments of the concepts and technologies described herein.

FIG. 7 is a block diagram illustrating a computer system 700 configured to provide the functionality described herein for determining and using elevation of a user device, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the elevation application 108 and/or the elevation service 116. These and/or other programs can be embodied in computer-readable media containing instructions that, when executed by the processing unit 702, perform one or more of the methods 200, 300, and/or 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the elevation data request 112, the elevation data 114, the location data update 120, the elevation cookie 122, the router data 128, the router location data 130, the building data 134, the signal data 140, the signal strength models 142, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
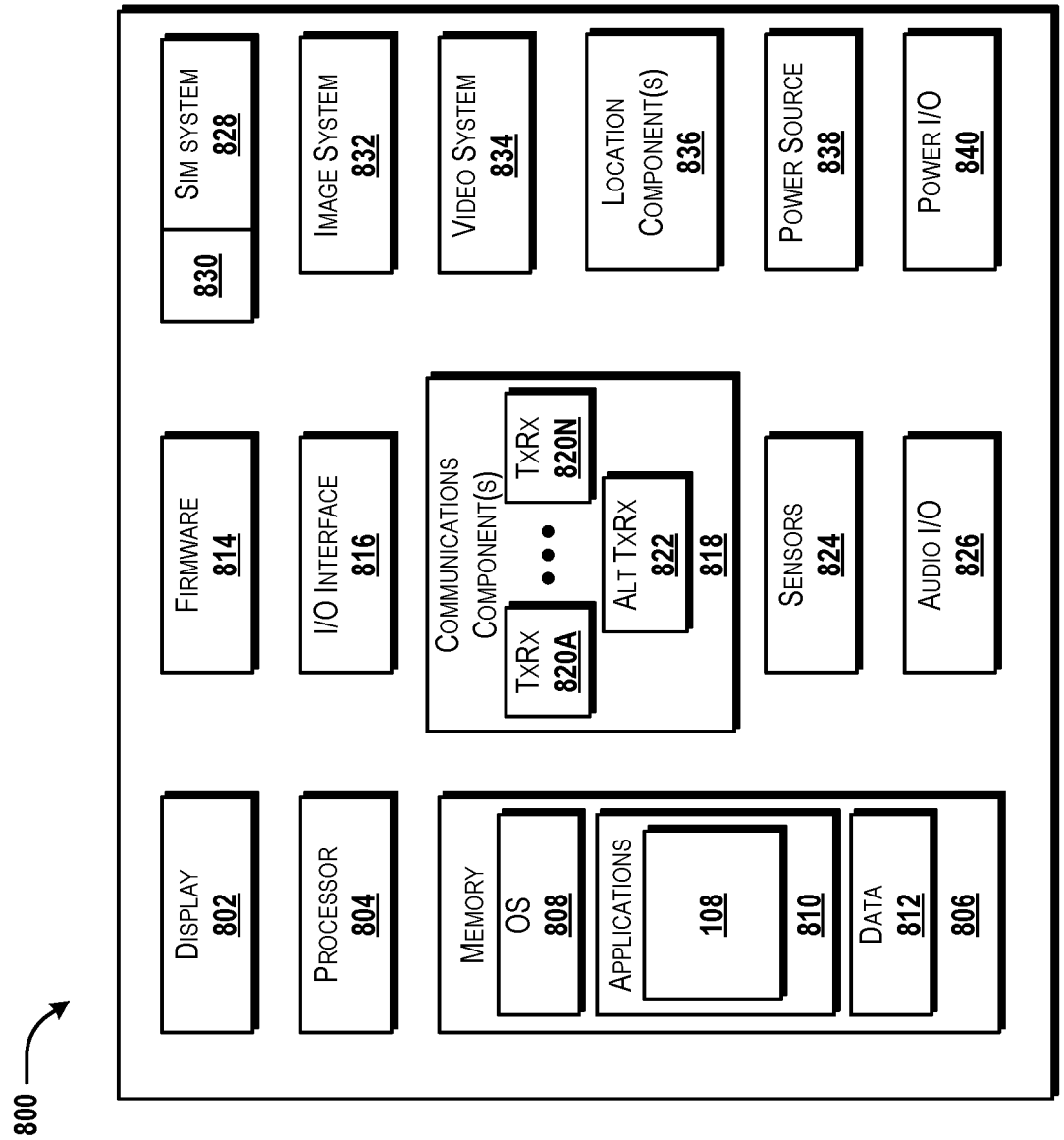
FIG. 8 is a block diagram illustrating an example mobile device configured to support determining and using elevation of a user device, according to some illustrative embodiments of the concepts and technologies described herein.

Turning now to FIG. 8, an illustrative mobile device 800 and components thereof will be described. In some embodiments, the user device 102 and/or the visiting device 124 described above with reference to FIGS. 1-5 can be configured as and/or can have an architecture similar or identical to the mobile device 800 described herein in FIG. 8. It should be understood, however, that the user device 102 and/or the visiting device 124 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, text, images, video, virtual keypads and/or keyboards, messaging data, notification messages, metadata, internet content, device status, time, date, calendar data, device preferences, map and location data, and/or windows, fields, or the like for obtaining elevation information, for sending elevation cookies or tokens (e.g., the elevation cookies 122), for identifying routers 110, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the elevation application 108 and/or the elevation service 116, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, presenting elevation information entry fields or forms, obtaining elevation information from a user or other entity, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, elevation application 108, the elevation service 116, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the elevation data request 112, the elevation data 114, the location data update 120, the elevation cookie 122, the router data 128, the router location data 130, the building data 134, the signal data 140, and/or the signal strength models 142, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an Nth transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
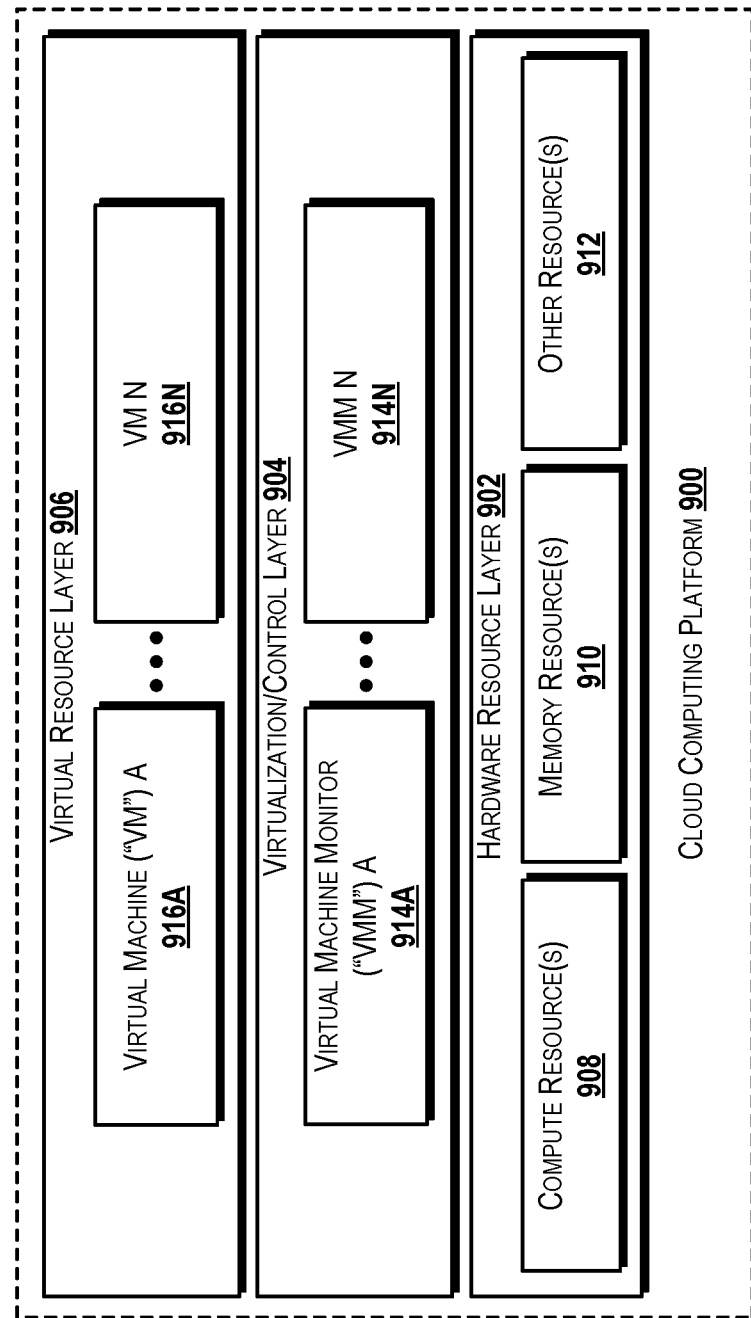
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for determining and using elevation of a user device and/or for interacting with the elevation application 108 and/or the elevation service 116. Thus, it can be appreciated that in some embodiments of the concepts and technologies disclosed herein, the cloud computing platform 900 illustrated in FIG. 9 can be used to provide the functionality described herein with respect to the user device 102, the routers 110, the server computer 118, the visiting device 124, the data store 132, the data sources 136, and/or the network devices 138.

The cloud computing platform 900 thus may be utilized to execute any aspects of the software components presented herein. Thus, according to various embodiments of the concepts and technologies disclosed herein, the elevation application 108 and/or the elevation service 116 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the elevation application 108 and/or the elevation service 116 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the elevation application 108 and/or the elevation service 116 or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the elevation data request 112, the elevation data 114, the location data update 120, the elevation cookie 122, the router data 128, the router location data 130, the building data 134, the signal data 140, the signal strength models 142, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for determining and using elevation of a user device have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:

generating router location data that comprises an identifier that identifies a router that is located at a geographic location and data that specifies an elevation at which the router is located at the geographic location;

detecting an elevation data request, the elevation data request identifying the router, wherein the elevation data request is associated with a user device;

querying the router location data to determine the elevation at which the router is located, generating, based on the elevation at which the router is located, elevation data that indicates the elevation at which the router is located; and sending, to the user device, the elevation data, wherein the user device is configured to generate an elevation cookie comprising a jumping token that defines the elevation, and wherein the user device is configured to provide the elevation cookie to a visiting device located at the geographic location to enable the visiting device to determine the elevation.

2. The system of claim 1, wherein generating the router location data comprises:

obtaining, from an Internet service provider, router data, wherein the router data comprises router identification data that indicates the identifier and router elevation data that defines the elevation at which the router is located;

generating, based on the router data, the router location data; and storing, at a data store, the router location data.

3. The system of claim 1, wherein the elevation data request is received from the user device.

4. The system of claim 1, wherein the elevation data request is created by the user device via functionality exposed by a server computer, wherein the functionality comprises one of an application programming interface or a portal.

5. The system of claim 2, wherein the router comprises a WiFi router, wherein the identifier comprises a service set identifier associated with the WiFi router, and wherein the WiFi router communicates with a wide area network via the Internet service provider.

6. The system of claim 1, wherein the computer-executable instructions, when executed by the processor, cause the processor to perform operations further comprising:
- obtaining, from a network device associated with a network, signal data that defines a plurality of signal strengths between the network device and the user device, wherein the plurality of signal strengths are measured as the user device moves through a building located at the geographic location;
- obtaining, from a data source, building data that identifies an interior of the building located at the geographic location;
- generating, based on the signal data and the building data, a signal strength model that models the plurality of signal strengths inside the building located at the geographic location; and
- storing the signal strength model.

7. The system of claim 6, wherein the computer-executable instructions, when executed by the processor, cause the processor to perform operations further comprising:
- receiving a further elevation data request from the user device;
- obtaining another instance of signal data that defines a current signal strength between the network device and the user device;
- generating, by providing the signal data to the signal strength model as input, a further instance of elevation data; and
- providing the further instance of elevation data to the user device.

8. The system of claim 1, wherein providing the elevation data to the user device comprises providing, to the user device, the elevation cookie.

9. The system of claim 1, wherein the elevation data identifies a floor of a building, and wherein the router is located on the floor of the building.

10. A method comprising:
- generating, at a computing device comprising a processor, router location data that comprises an identifier that identifies a router that is located at a geographic location and data that specifies an elevation at which the router is located at the geographic location;
- detecting, by the processor, an elevation data request, the elevation data request identifying the router, wherein the elevation data request is associated with a user device;
- querying, by the processor, the router location data to determine the elevation at which the router is located;
- generating, by the processor and based on the elevation at which the router is located, elevation data that indicates the elevation at which the router is located; and
- sending, by the processor and directed to the user device, the elevation data, wherein the user device is configured to generate an elevation cookie comprising a jumping token that defines the elevation, and wherein the user device is configured to provide the elevation cookie to a visiting device located at the geographic location to enable the visiting device to determine the elevation.

11. The method of claim 10, wherein generating the router location data comprises:
- obtaining, from an Internet service provider, router data, wherein the router data comprises router identification data that indicates the identifier and router elevation data that defines the elevation at which the router is located;
- generating, based on the router data, the router location data; and
- storing, at a data store, the router location data.

12. The method of claim 10, further comprising:
- obtaining, from a network device associated with a network, signal data that defines a plurality of signal strengths between the network device and the user device, wherein the plurality of signal strengths are measured as the user device moves through a building located at the geographic location;
- obtaining, from a data source, building data that identifies an interior of the building located at the geographic location;
- generating, based on the signal data and the building data, a signal strength model that models the plurality of signal strengths inside the building located at the geographic location; and
- storing the signal strength model.

13. The method of claim 12, further comprising:
- receiving a further elevation data request from the user device;
- obtaining another instance of signal data that defines a current signal strength between the network device and the user device;
- generating, by providing the signal data to the signal strength model as input, a further instance of elevation data; and
- providing the further instance of elevation data to the user device.

14. The method of claim 10, wherein providing the elevation data to the user device comprises providing, to the user device, the elevation cookie.

15. The method of claim 10, wherein the elevation data identifies a floor of a building, and wherein the router is located on the floor of the building.

16. A computer storage medium having computer-executable instructions stored thereon that, when executed by a processor, cause the processor to perform operations comprising:
- generating router location data that comprises an identifier that identifies a router that is located at a geographic location and data that specifies an elevation at which the router is located at the geographic location;
- detecting an elevation data request, the elevation data request identifying the router, wherein the elevation data request is associated with a user device;
- querying the router location data to determine the elevation at which the router is located;
- generating, based on the elevation at which the router is located, elevation data that indicates the elevation at which the router is located; and
- sending, to the user device, the elevation data, wherein the user device is configured to generate an elevation cookie comprising a jumping token that defines the elevation, and wherein the user device is configured to provide the elevation cookie to a visiting device located at the geographic location to enable the visiting device to determine the elevation.

17. The computer storage medium of claim 16, wherein generating the router location data comprises:
   obtaining, from an Internet service provider, router data, wherein the router data comprises router identification data that indicates the identifier and router elevation data that defines the elevation at which the router is located;
   generating, based on the router data, the router location data; and
   storing, at a data store, the router location data.

18. The computer storage medium of claim 16, wherein the computer-executable instructions, when executed by the processor, cause the processor to perform operations further comprising:
   obtaining, from a network device associated with a network, signal data that defines a plurality of signal strengths between the network device and the user device, wherein the plurality of signal strengths are measured as the user device moves through a building located at the geographic location;
   obtaining, from a data source, building data that identifies an interior of the building located at the geographic location;
   generating, based on the signal data and the building data, a signal strength model that models the plurality of signal strengths inside the building located at the geographic location; and
   storing the signal strength model.

19. The computer storage medium of claim 18, wherein the computer-executable instructions, when executed by the processor, cause the processor to perform operations further comprising:
   receiving a further elevation data request from the user device;
   obtaining another instance of signal data that defines a current signal strength between the network device and the user device;
   generating, by providing the signal data to the signal strength model as input, a further instance of elevation data; and
   providing the further instance of elevation data to the user device.

20. The computer storage medium of claim 16, wherein the elevation data identifies a floor of a building, and wherein the router is located on the floor of the building.

* * * * *